(12) United States Patent
Philip

(10) Patent No.: US 12,381,845 B2
(45) Date of Patent: Aug. 5, 2025

(54) SYSTEM FOR ADVANCED NETWORK TRAFFIC ANALYSIS IN A COMPUTING ENVIRONMENT

(71) Applicant: BANK OF AMERICA CORPORATION, Charlotte, NC (US)

(72) Inventor: Charles Philip, Andheri West Mumbai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 188 days.

(21) Appl. No.: 18/214,008

(22) Filed: Jul. 18, 2023

(65) Prior Publication Data
US 2025/0150436 A1 May 8, 2025

(51) Int. Cl.
*H04L 9/40* (2022.01)

(52) U.S. Cl.
CPC ...... *H04L 63/0227* (2013.01); *H04L 63/1416* (2013.01)

(58) Field of Classification Search
CPC .................................................. H04L 63/0227
See application file for complete search history.

(56) References Cited

U.S. PATENT DOCUMENTS

| | | | |
|---|---|---|---|
| 7,330,427 B2 | 2/2008 | Rodriguez | |
| 9,264,444 B2 | 2/2016 | Moore | |
| 9,602,338 B2 | 3/2017 | Zhang | |
| 9,628,580 B2 | 4/2017 | Yishay | |
| 9,705,849 B2 | 7/2017 | Sood | |
| 10,659,327 B2 | 5/2020 | Shanks | |
| 10,747,886 B2 | 8/2020 | El-Moussa | |
| 10,791,141 B2 | 9/2020 | Peteroy | |
| 11,128,550 B2 | 9/2021 | Lenglet | |
| 11,374,948 B2 | 6/2022 | Brandel | |
| 11,444,856 B2 | 9/2022 | Kieviet | |
| 11,539,720 B2 * | 12/2022 | Reybok, Jr. | H04L 63/1433 |
| 11,683,333 B1 | 6/2023 | Dominessy | |
| 11,895,143 B2 | 2/2024 | Satish | |
| 11,924,058 B2 * | 3/2024 | Veres | H04L 41/14 |
| 11,983,094 B2 * | 5/2024 | Downie | G06F 11/3698 |
| 2010/0017879 A1 * | 1/2010 | Kuegler | G06F 21/123 726/25 |
| 2014/0165204 A1 * | 6/2014 | Williams | G06F 21/55 726/25 |
| 2014/0201703 A1 * | 7/2014 | Boden | G06F 8/20 717/101 |
| 2018/0107821 A1 * | 4/2018 | Eshkenazi | G06F 21/52 |

(Continued)

*Primary Examiner* — Hieu T Hoang
(74) *Attorney, Agent, or Firm* — Moore & Van Allen PLLC; Anup Iyer

(57) ABSTRACT

Systems, computer program products, and methods are described herein for advanced network traffic analysis in a computing environment. The present disclosure is configured to retrieve, from a traffic data log of a Web Application Firewall (WAF), information associated with a blocked traffic instance; implement, using a code analysis subsystem, a security testing protocol on a host application associated with the blocked traffic instance; determine an exposure associated with the host application based on at least implementing the security testing protocol; generate a notification comprising information associated with the exposure; and transmit a signal configured to cause a computing device associated with the host application to display the notification.

20 Claims, 4 Drawing Sheets

(56) References Cited

U.S. PATENT DOCUMENTS

| | | | |
|---|---|---|---|
| 2020/0213322 A1* | 7/2020 | Anand | H04L 63/0876 |
| 2021/0011985 A1* | 1/2021 | Korotaev | H04L 63/1491 |
| 2022/0159008 A1 | 5/2022 | Anbalagan | |
| 2022/0385683 A1 | 12/2022 | Jones | |
| 2023/0205891 A1* | 6/2023 | Yellapragada | H04L 63/1433 |
| | | | 726/25 |
| 2023/0344846 A1 | 10/2023 | Turnquist | |
| 2023/0388338 A1 | 11/2023 | Satish | |
| 2024/0112115 A1 | 4/2024 | Ladnai | |
| 2024/0386113 A1* | 11/2024 | Singh | G06F 21/552 |

\* cited by examiner

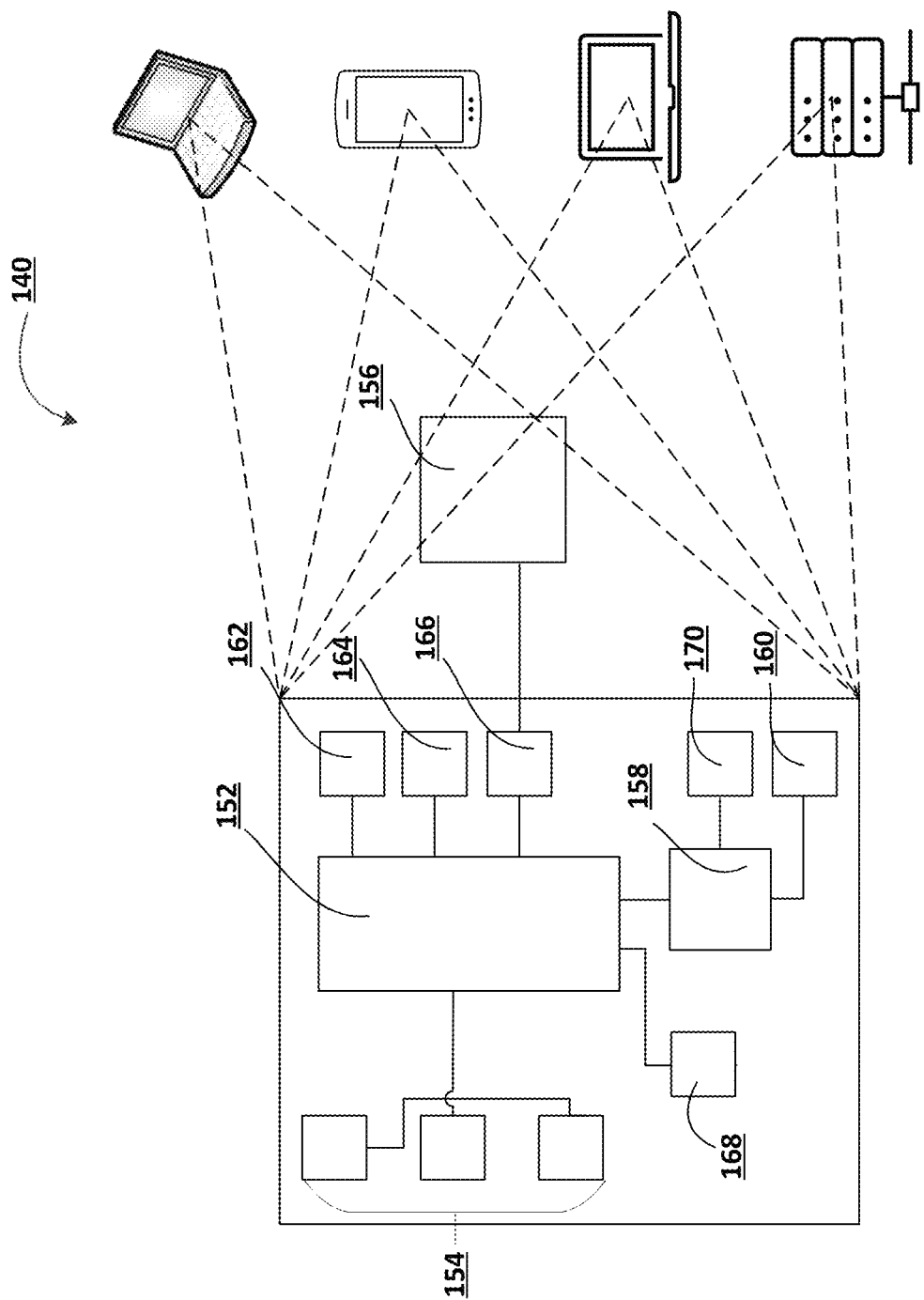

SYSTEM FOR ADVANCED NETWORK TRAFFIC ANALYSIS IN A COMPUTING ENVIRONMENT

TECHNOLOGICAL FIELD

Example embodiments of the present disclosure relate to network traffic analysis in a computing environment.

BACKGROUND

Network traffic refers to the flow of data packets between devices and systems within a network. Monitoring network traffic is crucial for maintaining the security of an entity's digital resources, as it enables the detection of potential threats, malicious activities, and exposures. By carefully analyzing and managing network traffic, entities can proactively identify and address security exposures, ensuring the integrity, confidentiality, and availability of their systems and applications.

Applicant has identified a number of deficiencies and problems associated with advanced network traffic analysis. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for advanced network traffic analysis in a computing environment.

In one aspect, a system for advanced network traffic analysis in a computing environment is presented. The system comprising: a processing device; a non-transitory storage device containing instructions when executed by the processing device, causes the processing device to perform the steps of: retrieve, from a traffic data log of a Web Application Firewall (WAF), information associated with a blocked traffic instance; implement, using a code analysis subsystem, a security testing protocol on a host application associated with the blocked traffic instance; determine an exposure associated with the host application based on at least implementing the security testing protocol; generate a notification comprising information associated with the exposure; and transmit a signal configured to cause a computing device associated with the host application to display the notification.

In some embodiments, executing the instructions further causes the processing device to: access a source code of the host application; and implement the security testing protocol on the source code of the host application.

In some embodiments, executing the instructions further causes the processing device to: determine an instance type associated with the blocked traffic instance; access a portion of the source code of the host application associated with the instance type; and implement the security testing protocol on the portion of the source code of the host application.

In some embodiments, executing the instructions further causes the processing device to: retrieve an access control rule from the WAF that resulted in the blocked traffic instance; generate a modification to the access control rule to only block portions of the blocked traffic instance that are associated with the exposure; and update the WAF with the modification to the access control rule.

In some embodiments, executing the instructions further causes the processing device to: implement, using the code analysis subsystem, the security testing protocol on all host applications; determine a subset of all host applications that are associated with the exposure; and generate a global access control rule for the WAF to block portions of network traffic from the subset of all host applications that are associated with the exposure.

In some embodiments, the notification further comprises code change recommendations for the host application, wherein the code change recommendations are configured to address the exposure.

In some embodiments, the security testing protocol comprises a static application security testing (SAST) and a dynamic application security testing (DAST).

In another aspect, a computer program product for advanced network traffic analysis in a computing environment is presented. The computer program product comprising a non-transitory computer-readable medium comprising code causing an apparatus to: retrieve, from a traffic data log of a Web Application Firewall (WAF), information associated with a blocked traffic instance; implement, using a code analysis subsystem, a security testing protocol on a host application associated with the blocked traffic instance; determine an exposure associated with the host application based on at least implementing the security testing protocol; generate a notification comprising information associated with the exposure; and transmit a signal configured to cause a computing device associated with the host application to display the notification.

In yet another aspect, a method for advanced network traffic analysis in a computing environment is presented. The method comprising: retrieving, from a traffic data log of a Web Application Firewall (WAF), information associated with a blocked traffic instance; implementing, using a code analysis subsystem, a security testing protocol on a host application associated with the blocked traffic instance; determining an exposure associated with the host application based on at least implementing the security testing protocol; generating a notification comprising information associated with the exposure; and transmitting a signal configured to cause a computing device associated with the host application to display the notification.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
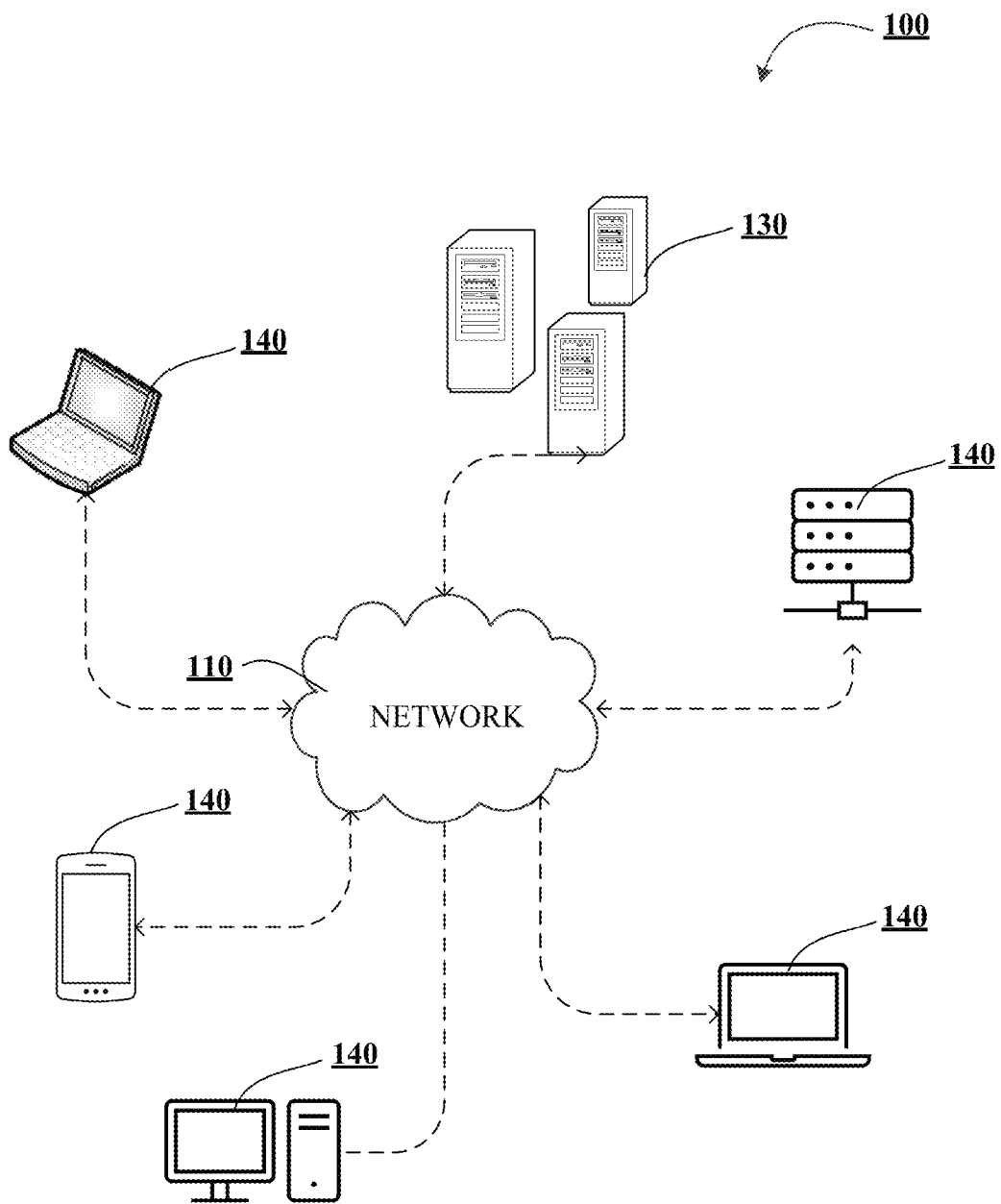
Figure 1B:
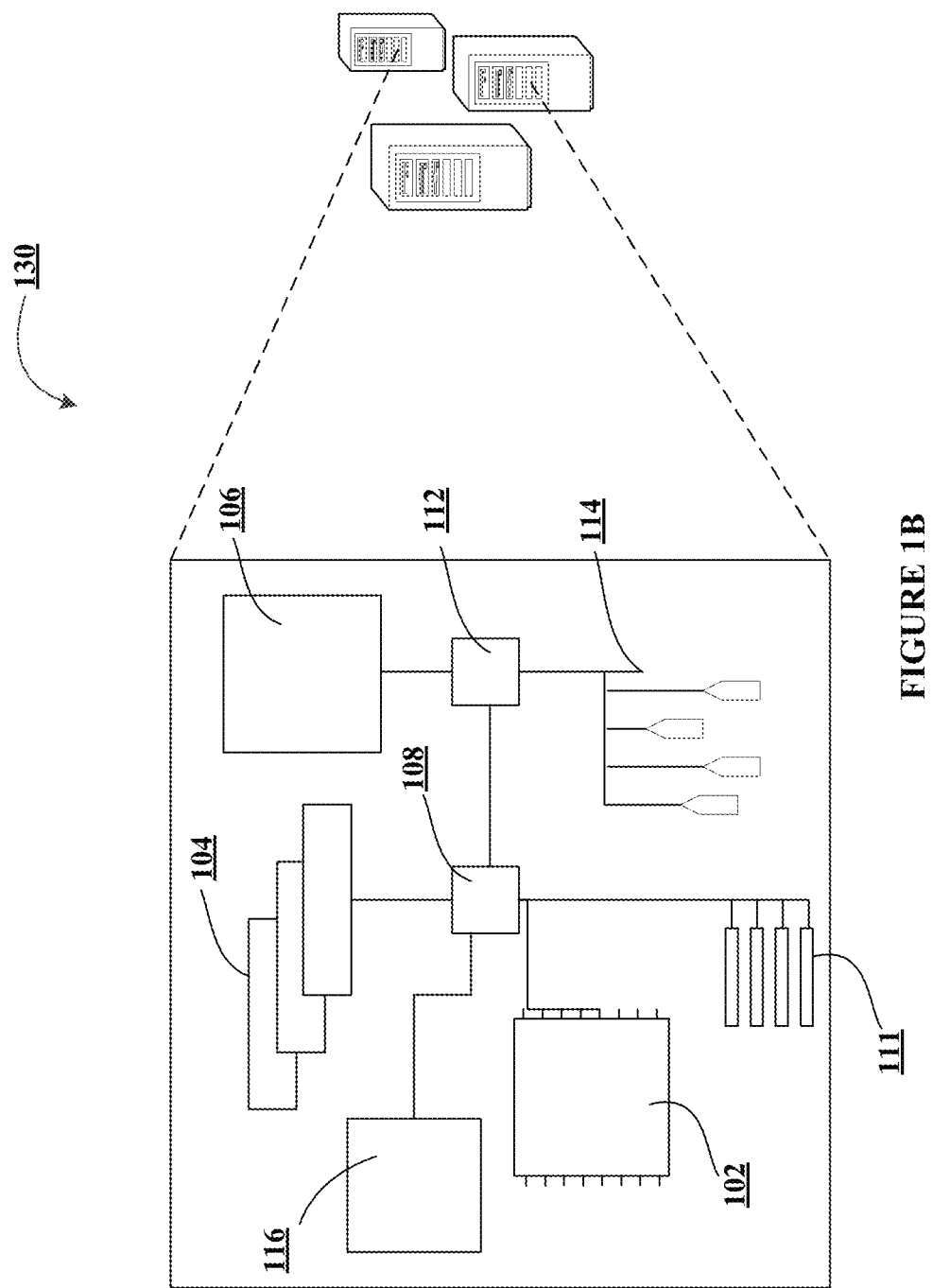
Figure 2:
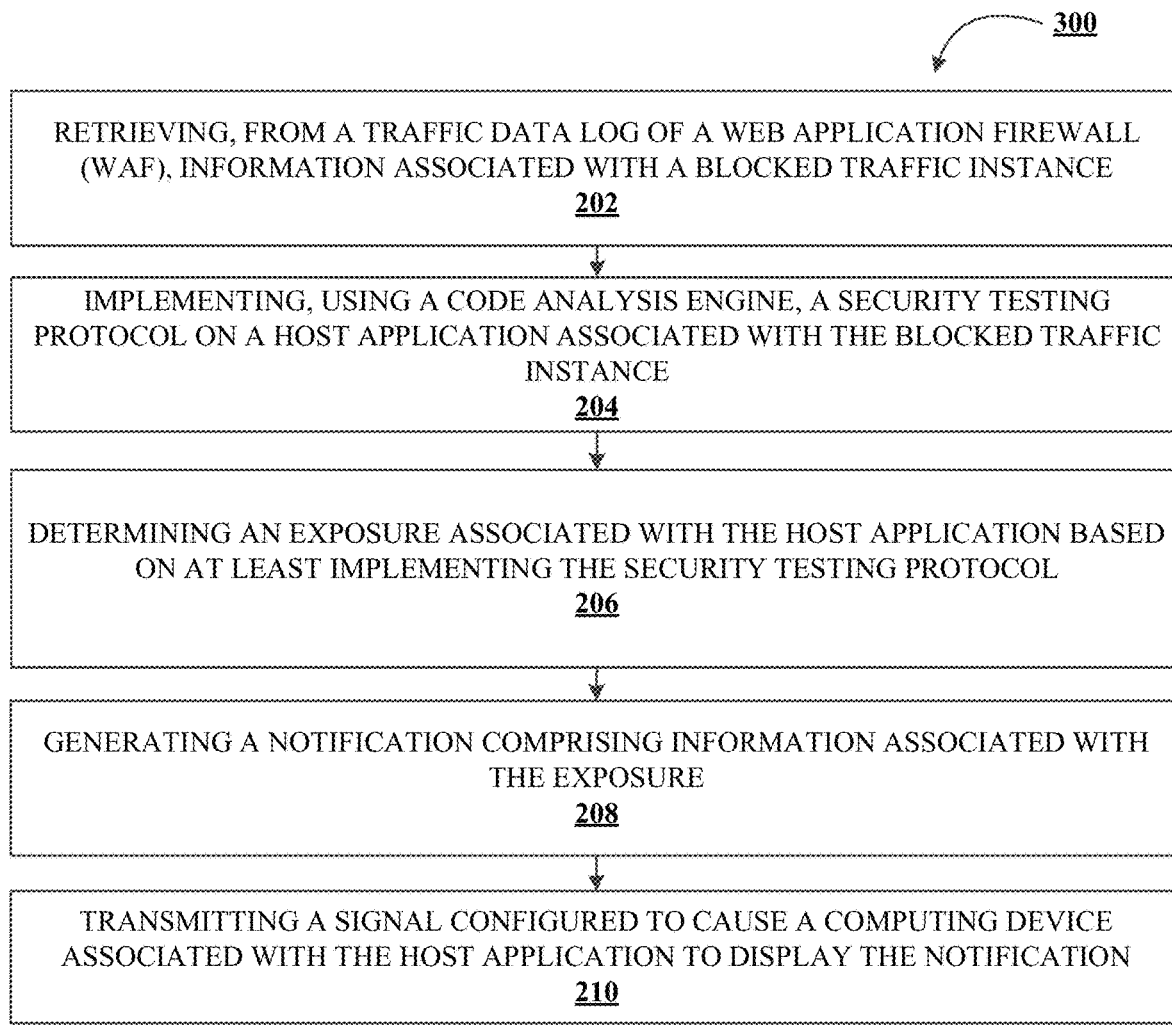

FIGS. 1A-1C illustrates technical components of an exemplary distributed computing environment for advanced network traffic analysis in a computing environment, in accordance with an embodiment of the disclosure;

FIG. 2 illustrates a process flow for advanced network traffic analysis in a computing environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Network traffic refers to the flow of data packets between devices and systems within a network. Monitoring network traffic is crucial for maintaining the security of an entity's digital resources, as it enables the detection of potential threats, malicious activities, and exposures. By carefully analyzing and managing network traffic, entities can proactively identify and address security exposures, ensuring the integrity, confidentiality, and availability of their systems and applications.

Embodiments of the present invention focus on a code analysis subsystem that is configured to analyze blocked traffic instances from the WAF to provide insights into potential exposures. In addition, by analyzing the blocked traffic instances, embodiments of the present invention provide modifications to access control rules that initially triggered the blocked traffic instances to block relevant portions of network traffic associated with the exposure, thus ensuring optimal protection against the exposure. Furthermore, embodiments of the present invention analyze the source code of multiple host applications, identifying those with same or similar exposures, and create global access control rules for the WAF to block relevant portions of network traffic associated with the exposure. In addition, embodiments of the present invention may suggest code change recommendations for the host application to address the exposure in its source code.

What is more, embodiments of the present invention provide a technical solution to a technical problem. The technical solution presented herein leverages WAFs and security testing protocols to enhance web application security by analyzing and filtering traffic, refining access control rules, and mitigating exposures through SAST and DAST methodologies. This comprehensive approach to security monitoring ensures optimal protection against potential threats and vulnerabilities in the network traffic landscape. As such, embodiments of the present invention provide a more accurate solution to problem, thus reducing the number of resources required to remedy any errors made due to a less accurate solution. Furthermore, embodiments of the present invention remove manual input and waste from the implementation of the solution, thus improving speed and efficiency of the process and conserving computing resources. Lastly, embodiments of the present invention determine an optimal amount of resources that need to be used to implement the solution, thus reducing network traffic and load on existing computing resources. In addition, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for advanced network traffic analysis in a computing environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like. The end-point device(s) 140 may also include client devices having software applications installed therein that initiate requests for resources, services, or information from other devices within the distributed computing environment 100, such as web browsers.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

In example embodiments, the distributed computing environment 100 may also include a Web Application Firewall (WAF) (not shown) that is configured to inspect and filter incoming traffic (e.g., HTTP/HTTPS traffic) between the end-point device(s) 140 and the system 130 (e.g., web servers). WAF is a security solution designed to protect web applications from various types of cyberattacks, such as SQL injection, cross-site scripting (XSS), and manipulation of known vulnerabilities. WAF is typically used to examine incoming requests, apply pre-defined access control rules and policies, and block malicious requests before they reach a web application, thus safeguarding it from potential security threats. In an example embodiment, WAF may be deployed on-premises. In an on-premises deployment, the WAF may be installed as a dedicated hardware appliance or a virtual appliance within the distributed computing environment 100. WAF is often placed in the DMZ (Demilitarized Zone), an isolated subnet between the internal network and the external internet. The DMZ hosts public-facing web applications, and the WAF helps protect these applications from attacks originating from the Internet. In another example embodiment, the WAF may be deployed on in a cloud environment. In a cloud-based deployment, the WAF is hosted in the cloud and processes traffic before it reaches the web application, regardless of whether the application is hosted on-premises or in the cloud. Cloud-based WAFs can offer scalability, ease of management, and reduced infrastructure costs. In yet another example embodiment, the WAF may be integrated directly with the system 130 or hosting platform. Here, the WAF is installed as a software module, plugin, or container within the application server environment. This can provide a more streamlined approach to application security but may also require more resources from the server hosting the application. In all these scenarios, the primary function of the WAF is to inspect incoming traffic, identify potentially malicious requests, and block them before they reach the web application, helping to protect the application from security threats.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

In embodiments where the system 130 is a web server, the system 130 may be deployed in strategic locations based on security requirements, performance, and accessibility. In one example embodiment, the system 130 may be deployed in the DMZ, an isolated subnet between the internal network and the external internet. The DMZ may act as a buffer zone that segregates public-facing web applications from the internal network, providing an additional layer of security. In this setup, traffic from the internet must pass through firewalls (e.g., WAF) before reaching the system 130. In another example embodiment, the system 130 may be placed within the internal network (e.g., network 110), particularly when they host applications meant for internal use only (e.g., intranet applications, internal management systems). Access to the system 130, in such cases, is typically restricted to users within the organization's network, and external access can be granted via secure remote access methods. In yet another example embodiment, for entities with both public-facing and internal applications, a hybrid deployment can be used, the system 130 may be placed in the DMZ to host public-facing applications and also within the internal network to host internal applications. Regardless of where system 130 is placed in a network, appropriate security measures, such as firewalls, intrusion detection/prevention systems (IDS/IPS), and Web Application Firewalls (WAFs), may be implemented to protect the system 130 and other servers and applications in the distributed computing environment 100 from potential threats.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for advanced network traffic analysis in a computing environment, in accordance with an embodiment of the disclosure. As shown in block 202, the process flow includes retrieving, from a traffic data log of a WAF, information associated with a blocked traffic instance. In some embodiments, a blocked traffic instance may refer to a specific event where the WAF has identified a request as potentially malicious or in violation of its access control rules and has blocked it from reaching the web server (e.g., system 130). This can include requests associated with attacks like SQL injection, cross-site scripting (XSS), or other known vulnerabilities. As described herein, a WAF may continuously monitor and filter incoming traffic to protect web applications from various types of cyberattacks. As part of its operation, the WAF may maintain a log of traffic data, which records details about requests, including those that are allowed and those that are blocked. These logs contain valuable information for security administrators, such as timestamps, source and destination IP addresses, request methods, URLs, headers, and the specific access control rule-a set of predefined conditions or criteria used to determine whether to allow or block incoming traffic based on various factors, such as IP addresses, URL patterns, HTTP methods, query parameters, request headers, specific patterns in the payload, and/or the like-that triggered the block. To analyze the blocked traffic instances, the system may access the WAF's traffic data log and extract relevant information about the events. This may involve querying the log based on specific criteria, such as time ranges, IP addresses, or specific access control rule triggers.

As shown in block 204, the process flow includes implementing, using a code analysis subsystem, a security testing protocol on a host application associated with the blocked traffic instance. In some embodiments, a code analysis subsystem may be configured to perform security testing on the host application associated with the blocked traffic instance. To this end, the code analysis subsystem may be configured to access the source code of the host application. The source code is the collection of human-readable instructions, written in a programming language, that define the functionality of the host application. Upon obtaining access to the source code, the system may use the code analysis subsystem to analyze the source code to detect potential security vulnerabilities, coding errors, or performance issues.

In some embodiments, the security testing protocol may include Static Application Security Testing (SAST) and Dynamic Application Security Testing (DAST) techniques to identify and address potential vulnerabilities in the host application. SAST, also known as white-box testing, may involve analyzing the host application's source code, byte code, or binary code to identify potential security vulnerabilities without actually executing the application. SAST tools can detect issues such as input validation errors, buffer overflows, insecure coding practices, and other code-level vulnerabilities. DAST, also known as black-box testing, involves testing a running host application to identify security vulnerabilities by simulating external attacks. DAST tools may interact with the host application's exposed interfaces, such as APIs or web interfaces, to detect issues like SQL injection, cross-site scripting (XSS), and insecure authentication mechanisms. Implementing DAST on the host application associated with the blocked traffic instance can help uncover vulnerabilities that may only be detectable during runtime or through interaction with the host application. In an example implementation, the security testing protocol may implement both SAST and DAST techniques for a more comprehensive approach. SAST may provide early detection of code-level vulnerabilities during the development process, while DAST may identify runtime vulnerabilities and issues that emerge when the host application interacts with external systems or users. In some embodiments, the security testing protocol may include a code quality assessment to evaluate the overall quality and maintainability of the source code of the host application by identifying areas of improvement, such as code complexity, adherence to coding standards, and potential code smells. In some other embodiments, the security testing protocol may analyze the source code of the host application for potential performance bottlenecks or inefficiencies.

In some embodiments, the system may identify the type or category of a blocked traffic instance and subsequently access the relevant part of the host application's source code related to that specific type to focus on the most relevant code sections when analyzing and addressing potential vulnerabilities or issues. Blocked traffic instances may be associated with different types or categories based on the nature of the threat and/or the specific access control rule that triggered the block. Examples of instance types may include SQL injection, cross-site scripting (XSS), authentication-related issues, and/or the like. Once the instance type is determined, the system may identify specific sections of the host application's source code that are most relevant to that type. For example, if the blocked traffic instance is related to SQL injection, the relevant code sections may include those responsible for handling database queries or user input validation. Upon identifying specific sections of the host application's source code, the system may use the code analysis subsystem to analyze the source code and to detect potential security vulnerabilities, coding errors, or performance issues.

As shown in block 206, the process flow includes determining an exposure associated with the host application based on at least implementing the security testing protocol. In some embodiments, an exposure may refer to any vulnerability, weakness, security flaw, and/or the like, associated with the host application that could be manipulated by malicious users to compromise the host application or gain unauthorized access to sensitive information therethrough. In some embodiments, in addition to determining the exposure, the system may assess the potential impact of the exposure on the host application and the overall system. The assessment involves evaluating factors such as the severity of the vulnerability, the likelihood of manipulation, potential consequences of a successful attack, and/or the like.

As shown in block 208, the process flow includes generating a notification comprising information associated with the exposure. In some embodiments, the information associated with the exposure may include details such as the location of the exposure in the application's code, the type and severity of the vulnerability, potential attack vectors, and/or the like. In some embodiments, the notification may also include code change recommendations for the host application that address the exposure in the source code of the host application.

As shown in block 210, the process flow includes transmitting a signal configured to cause a computing device associated with the host application to display the notification. In one example embodiment, the system may send a signal or message over a network to a specific computing device, such as a developer's workstation or a server, which is responsible for the host application. This signal may be configured to trigger the display of the notification containing information about the identified exposure (vulnerability or weakness) on the computing device.

Typically, access control rules in the WAF are Boolean in nature, meaning that they result in a binary decision of either allowing or blocking network traffic (e.g., a specific request). As such, access control rules are designed to evaluate incoming traffic requests against a set of predefined conditions or criteria, and then decide based on whether the traffic meets the specified conditions or not. Accordingly, in some embodiments, the system may refine the access control rule that triggered the blocked traffic instance based on the exposure identified in the source code of the host application, and the blocked traffic instance. Such a refinement aims to improve the access control rule's accuracy by targeting only the portions of the traffic associated with the exposure, rather than blocking the entire traffic instance. To this end, the system may adjust the conditions or criteria of the rule, such as refining URL patterns, query parameters, or request content checks, to better align with the characteristics of the exposure. Upon refining the access control rule, the system may update the access control rule in the WAF to improve its accuracy and minimize potential false positives. Upon updating the access control rule, the system may monitor WAF's performance for a specific period of time to analyze the impact of the rule change to determine whether any additional improvements are necessary, thus ensuring effective protection.

In some embodiments, the system may implement the security testing protocol across multiple host applications, identifying those with the exposure, and creating a global access control rule for the WAF to block relevant portions of network traffic associated with that exposure. To this end, the system may implement, using the code analysis engine, the security testing protocol, in a prioritized approach, across all host applications (e.g., host applications with high priority are analyzed first) to identify each host application that may be associated with the exposure that could be manipulation by malicious users to compromise the host application or gain unauthorized access to sensitive information therethrough. Upon applying the security testing protocol, the system may determine a subset of all host applications associated with the exposure. For each affected host application, the system may analyze the instances of the exposure to understand the specific portions of network traffic that need to be blocked by the WAF. In doing so, the system may ensure that the global access control rule is tailored to block only the relevant traffic, reducing the likelihood of false positives and unnecessary disruptions. Upon analyzing the instances of the exposure, the system may generate a global access control rule for the WAF that is designed to block portions of network traffic from the subset of host applications that are associated with the exposure.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for advanced network traffic analysis in a computing environment, the system comprising:
   a processing device;
   a non-transitory storage device containing instructions when executed by the processing device, causes the processing device to perform the steps of:
   retrieve, from a traffic data log of a Web Application Firewall (WAF), information associated with a blocked traffic instance;
   implement, using a code analysis subsystem, a security testing protocol on a host application associated with the blocked traffic instance;
   determine an exposure associated with the host application based on at least implementing the security testing protocol;
   generate a notification comprising information associated with the exposure; and
   transmit a signal configured to cause a computing device associated with the host application to display the notification.

2. The system of claim 1, wherein executing the instructions further causes the processing device to:
   access a source code of the host application; and
   implement the security testing protocol on the source code of the host application.

3. The system of claim 2, wherein executing the instructions further causes the processing device to:
   determine an instance type associated with the blocked traffic instance;
   access a portion of the source code of the host application associated with the instance type; and
   implement the security testing protocol on the portion of the source code of the host application.

4. The system of claim 1, wherein executing the instructions further causes the processing device to:
   retrieve an access control rule from the WAF that resulted in the blocked traffic instance;

generate a modification to the access control rule to only block portions of the blocked traffic instance that are associated with the exposure; and update the WAF with the modification to the access control rule.

5. The system of claim 1, wherein executing the instructions further causes the processing device to:

implement, using the code analysis subsystem, the security testing protocol on all host applications;

determine a subset of all host applications that are associated with the exposure; and generate a global access control rule for the WAF to block portions of network traffic from the subset of all host applications that are associated with the exposure.

6. The system of claim 1, wherein the notification further comprises code change recommendations for the host application, wherein the code change recommendations are configured to address the exposure.

7. The system of claim 1, wherein the security testing protocol comprises a static application security testing (SAST) and a dynamic application security testing (DAST).

8. A computer program product for advanced network traffic analysis in a computing environment, the computer program product comprising a non-transitory computer-readable medium comprising code causing an apparatus to:

retrieve, from a traffic data log of a Web Application Firewall (WAF), information associated with a blocked traffic instance;

implement, using a code analysis subsystem, a security testing protocol on a host application associated with the blocked traffic instance;

determine an exposure associated with the host application based on at least implementing the security testing protocol;

generate a notification comprising information associated with the exposure; and transmit a signal configured to cause a computing device associated with the host application to display the notification.

9. The computer program product of claim 8, wherein the code further causes the apparatus to:

access a source code of the host application; and implement the security testing protocol on the source code of the host application.

10. The computer program product of claim 9, wherein the code further causes the apparatus to:

determine an instance type associated with the blocked traffic instance;

access a portion of the source code of the host application associated with the instance type; and implement the security testing protocol on the portion of the source code of the host application.

11. The computer program product of claim 8, wherein the code further causes the apparatus to:

retrieve an access control rule from the WAF that resulted in the blocked traffic instance;

generate a modification to the access control rule to only block portions of the blocked traffic instance that are associated with the exposure; and update the WAF with the modification to the access control rule.

12. The computer program product of claim 8, wherein the code further causes the apparatus to:

implement, using the code analysis subsystem, the security testing protocol on all host applications;

determine a subset of all host applications that are associated with the exposure; and generate a global access control rule for the WAF to block portions of network traffic from the subset of all host applications that are associated with the exposure.

13. The computer program product of claim 8, wherein the notification further comprises code change recommendations for the host application, wherein the code change recommendations are configured to address the exposure.

14. The computer program product of claim 8, wherein the security testing protocol comprises a static application security testing (SAST) and a dynamic application security testing (DAST).

15. A method for advanced network traffic analysis in a computing environment, the method comprising:

retrieving, from a traffic data log of a Web Application Firewall (WAF), information associated with a blocked traffic instance;

implementing, using a code analysis subsystem, a security testing protocol on a host application associated with the blocked traffic instance;

determining an exposure associated with the host application based on at least implementing the security testing protocol;

generating a notification comprising information associated with the exposure; and transmitting a signal configured to cause a computing device associated with the host application to display the notification.

16. The method of claim 15, wherein the method further comprises:

accessing a source code of the host application; and implementing the security testing protocol on the source code of the host application.

17. The method of claim 16, wherein the method further comprises:

determining an instance type associated with the blocked traffic instance;

accessing a portion of the source code of the host application associated with the instance type; and implementing the security testing protocol on the portion of the source code of the host application.

18. The method of claim 15, wherein the method further comprises:

retrieving an access control rule from the WAF that resulted in the blocked traffic instance;

generating a modification to the access control rule to only block portions of the blocked traffic instance that are associated with the exposure; and updating the WAF with the modification to the access control rule.

19. The method of claim 15, wherein the method further comprises:

implementing, using the code analysis subsystem, the security testing protocol on all host applications;

determining a subset of all host applications that are associated with the exposure; and generating a global access control rule for the WAF to block portions of network traffic from the subset of all host applications that are associated with the exposure.

20. The method of claim 15, wherein the notification further comprises code change recommendations for the host application, wherein the code change recommendations are configured to address the exposure.

* * * * *